(12) United States Patent
Rollwa et al.

(10) Patent No.: US 11,807,454 B2
(45) Date of Patent: Nov. 7, 2023

(54) STACKING STORAGE ARRANGEMENT

(71) Applicant: Jungheinrich Aktiengesellschaft, Hamburg (DE)

(72) Inventors: Volker Rollwa, Pirmasens (DE); Jörg Cavelius, Bad Vilbel (DE); Michael Becker, Hainburg (DE); Markus Liebhaber, Oberursel (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 430 days.

(21) Appl. No.: 16/998,647

(22) Filed: Aug. 20, 2020

(65) Prior Publication Data
US 2021/0053758 A1     Feb. 25, 2021

(30) Foreign Application Priority Data
Aug. 23, 2019 (EP) ..................................... 19193381

(51) Int. Cl.
*B65D 21/02*     (2006.01)
*B66F 9/06*     (2006.01)
(Continued)

(52) U.S. Cl.
CPC ......... *B65G 1/0471* (2013.01); *B65G 1/0492* (2013.01); *B65G 1/133* (2013.01);
(Continued)

(58) Field of Classification Search
CPC .... B65G 1/0471; B65G 1/0492; B65G 1/133; B65G 39/18; B65G 47/82; B65G 21/0209; B66F 9/06
See application file for complete search history.

(56) References Cited

U.S. PATENT DOCUMENTS

| | | | | |
|---|---|---|---|---|
| 4,018,351 A | * | 4/1977 | Stobb ................. | B65H 31/3054 414/754 |
| 4,096,958 A | * | 6/1978 | Stobb ................. | B65H 31/3081 414/800 |

(Continued)

FOREIGN PATENT DOCUMENTS

| | | |
|---|---|---|
| CN | 205419690 | 8/2016 |
| CN | 205932113 | 2/2017 |

(Continued)

OTHER PUBLICATIONS

China Search Report/Office Action conducted in counterpart China Appln. No. 202010611720.7 (dated Oct. 25, 2021).

(Continued)

*Primary Examiner* — Saul Rodriguez
*Assistant Examiner* — Ashley K Romano
(74) *Attorney, Agent, or Firm* — GREENBLUM & BERNSTEIN, P.L.C.

(57) ABSTRACT

A stacking storage arrangement includes multiple container receiving spaces, a loading space arranged below the container receiving spaces, in which the container receiving spaces are held at a first height above the loading space; and a loading vehicle movable between the loading space and a transfer region. The loading vehicle includes a container seat with a container contact surface, and the container seat is movable in a lifting direction. In the container contact surface, the container seat further includes at least two notches opening to at least one side, and at least one transfer device includes transfer fingers configured to match the notches in the container contact surface.

17 Claims, 2 Drawing Sheets

(51) Int. Cl.
*B65G 47/82* (2006.01)
*B65G 39/18* (2006.01)
*B65G 1/133* (2006.01)
*B65G 1/04* (2006.01)

(52) U.S. Cl.
CPC ............ *B65G 39/18* (2013.01); *B65G 47/82* (2013.01); *B66F 9/06* (2013.01); *B65D 21/0209* (2013.01)

(56) References Cited

U.S. PATENT DOCUMENTS

| | | | |
|---|---|---|---|
| 4,690,601 A | | 9/1987 | Delius et al. |
| 5,064,330 A | | 11/1991 | Yuzo |
| 5,174,429 A | * | 12/1992 | La Vars ................ B07C 5/362 |
| | | | 198/482.1 |
| 10,207,871 B2 | | 2/2019 | Issing |
| 10,450,136 B2 | * | 10/2019 | Schroer ................ B65G 1/0421 |
| 2009/0074545 A1 | * | 3/2009 | Lert, Jr. ................ B65G 1/1378 |
| | | | 414/267 |
| 2016/0207710 A1 | * | 7/2016 | Conrad ................ B65G 1/0492 |
| 2017/0101274 A1 | * | 4/2017 | Sullivan ................ B65G 47/086 |
| 2018/0265291 A1 | | 9/2018 | Wagner et al. |
| 2019/0129371 A1 | | 5/2019 | Wagner et al. |
| 2019/0389671 A1 | * | 12/2019 | Cohen .................... B65G 47/71 |

FOREIGN PATENT DOCUMENTS

| | | |
|---|---|---|
| CN | 206971854 | 2/2018 |
| CN | 107758569 | 3/2018 |
| CN | 108423084 | 8/2018 |
| CN | 108726070 | 11/2018 |
| DE | 102008039764 | 5/2010 |
| DE | 102013009340 | 12/2014 |
| EP | 0012733 | 6/1980 |
| EP | 3341308 | 7/2018 |
| WO | 2018/233886 | 12/2018 |

OTHER PUBLICATIONS

Europe Search Report/Office Action conducted in counterpart Europe U.S. Appl. No. 19/193,381 (Feb. 21, 2020).

* cited by examiner

STACKING STORAGE ARRANGEMENT

CROSS-REFERENCE TO RELATED APPLICATIONS

The present application claims priority under 35 U.S.C. § 119 of European Patent Application No. EP 19193381.1, filed Aug. 23, 2019, the disclosure of which is expressly incorporated by reference herein in its entirety.

BACKGROUND OF THE INVENTION

1. Field of the Invention

The present invention relates to a stacking storage arrangement having multiple container receiving spaces, a loading space that is arranged below the container receiving spaces, a holding arrangement between the loading space and the container receiving spaces that is arranged at a first height, and a loading vehicle that can be moved between the loading space and a transfer region and comprises a container seat with a container contact surface, which container seat can be moved in a lifting direction by a lifting device.

2. Discussion of Background Information

A stacking storage arrangement of this type is known from EP 0 012 733 B1, for example.

In a stacking storage arrangement, containers can be stored in a stacked form. One container receiving space is provided for each of these container stacks. The container receiving spaces can be arranged such that they are relatively closely adjacent, so that an available storage space can be extremely well utilized.

When a container is added to a stack at the bottom or is removed from the stack at the bottom, then a loading vehicle is driven through the loading space until it can be positioned beneath the corresponding container receiving space. When a container is placed into storage, the container is lifted until it comes into contact with the bottommost container of the stack already present. The container being placed into storage is then lifted further and, as a result, lifts the entire stack along with it. The lifting takes place until the container being newly placed into storage can be held by a holding device that typically clicks into place on the container. The holding devices of all container receiving spaces form a holding arrangement.

When the bottommost container is removed from the container receiving space, the loading vehicle is used again, which loading vehicle lifts the entire stack until the container being removed comes free of the holding device. The holding device is then opened and kept open until the container being removed has been lowered past the holding device. The holding device then becomes active again and holds the remaining containers of the stack. The container being removed can then be lowered further and driven out of the loading space into the transfer region. In the transfer region, the container must then be removed from the loading vehicle, or the loading vehicle must transfer the container to the transfer region, before it can be used again.

SUMMARY OF THE INVENTION

Embodiments of the invention are directed to a cost-effective design for a stacking storage arrangement.

In embodiments, a stacking storage arrangement of the type named at the outset in that the container seat includes, in a container contact surface, at least two notches opening to at least one side and the transfer device includes transfer fingers matching the notches.

The loading vehicle can then be driven into the transfer device such that the transfer fingers enter into the notches. The transfer fingers are then located directly beneath the container that is to be removed from the loading vehicle. The container is then transferred to the transfer fingers in a simple manner by lowering the container seat. The procedure is the same for loading the loading vehicle. The loading vehicle is driven underneath the transfer fingers. The container seat is lifted so that the transfer fingers can enter into the notches. The container seat is then lifted far enough that the container comes free of the transfer fingers and the loading vehicle can be moved away from the transfer device in the direction of the longitudinal extension of the transfer fingers.

The transfer fingers preferably form a support surface that merges into a transport device at the same height. Thus, a lifting movement of the container is also not required between the transfer fingers and the transport device. The container can be moved easily from the transfer fingers onto the transport device on one plane without the need to overcome a difference in height.

Preferably, the transport device is connected to two types of transfer devices, wherein a first type of transfer device is used to supply a container that is being placed into storage in a container receiving space, and a second type of transfer device is used to receive a container removed from a container receiving space. The placing of containers into storage in the container receiving space and the removal of containers from storage out of the container receiving space can thus be decoupled from one another.

Preferably, the transport device forms a preferably closed circuit and a transfer device of the first type is arranged closer to the container receiving spaces than a transfer device of the second type. The transport device can, for example, be embodied in the shape of an oval. However, it is also possible to embody it such that it is merely U-shaped, even though a closed circuit is advantageous, since in this case containers can be guided in a loop, as it were. If the transfer device of the first type is arranged closer to the container receiving spaces, then a loading vehicle that has transferred a removed container to the transfer device of the second type can be used to transport a container that is to be placed into storage into one of the container receiving spaces on the return trip, as it were.

In this case, it is preferred that the transfer devices are arranged inside the circuit. A space-saving design is thus realized.

It is also advantageous that a transfer device of the first type and a transfer device of the second type are arranged consecutively in a direction of travel of the loading vehicle. The vehicle can then drive in a linear movement from the transfer device of the second type to the transfer device of the first type, where it can receive a container that is to be placed into storage.

Preferably, particularly in the transfer device of the second type, transfer fingers are provided which comprise rollers that can be rotationally driven about roller axes and on whose circumference rolling bodies are arranged that can be rotated about rolling body axes, wherein the roller axes and the rolling body axes are aligned askew of one another and the rolling bodies of the rollers have opposing directions. The roller axes and the rolling body axis do not intersect. The rolling bodies are arranged externally on the driven rollers. Accordingly, a container is placed on the rolling bodies. The rolling bodies on which the container rests have oppositely directed angles, preferably oppositely equal angles. If the driven rollers are then rotated, the rollers with the circumferential surfaces thereof then also set the rolling bodies in a rotational motion. This rotational motion has a component that is directed parallel to the roller axes. In this manner, it is possible to convey the container parallel to the roller axes so that the container can be conveyed from the transfer device onto the transport device.

Preferably, particularly in the transfer device of the first type, transfer fingers that are embodied as a preferably inclined bar of small rollers are provided. With an inclined bar of small rollers, there are multiple "small rollers," that is, little rollers, the rotational axis of which is directed perpendicular to a direction of motion of the container. The container can then roll on these small rollers. A rolling movement of this type occurs automatically if the bar of small rollers is inclined. Because the transfer device of the first type is provided to keep ready a container that is to be placed into storage in a container receiving space, it is only necessary to convey the container from the transport device onto the bar of small rollers. Once it has arrived with its center of gravity on the bar of small rollers, it automatically moves to the end of the bar of small rollers, wherein a stop or other similar means is preferably provided.

Preferably, the transport device comprises, in the region of at least one transfer device, rollers arranged in pairs, which rollers can be rotationally driven about roller axes and on whose circumference rolling bodies that can be rotated about rolling body axes are arranged, wherein the roller axes and the rolling body axes are aligned askew of one another and the rolling bodies of one pair of the rollers have opposing directions, wherein each driven roller can be driven in two rotation directions. Here, the same technique that was described above in connection with the transfer device of the second type can be used. However, movements can be realized in the transport device in two directional axes and forwards and backwards in each directional axis, that is, 4 movements in total (forwards, backwards, left, right). If the rotatable rollers are driven in the same direction, then a transport of a container occurs perpendicular to the roller axes. If, on the other hand, the rollers in a pair are driven in opposing directions, then the movement of the container occurs parallel to the axes. Accordingly, it is possible to infeed and outfeed containers using the transport device, for example at the two transfer devices. The term "pair" is intended here to state that there are two types of rollers that differ in that the rolling bodies thereof form oppositely equal angles in each case where a container rests. It must thereby be ensured that a container always rests on two different rollers in order to be able to achieve the desired conveying effect. The rollers in a pair thereby do not necessarily need to be, but preferably are, arranged next to one another.

Preferably, on the side of the transport device opposite of the transfer device of the second type, a handling station is arranged in which an operator has access to a container. Normally, a container is removed from a container receiving space in order to remove goods stored therein. This removal can preferably be carried out in the handling station.

Preferably, at least one transfer device is arranged in the transfer region, which transfer device is arranged at a second height that corresponds to the first height. The first height and the second height thereby do not necessarily need to be identical in a mathematical sense. However, the transfer device is arranged roughly at the height at which the bottom container of a stack is held in the holding arrangement. In this manner, all lifting movements for the placement and removal of the container into and out of storage, respectively, and for the placing of the container into the loading vehicle and for removing the container from the loading vehicle can be realized by the lifting movement of the container seat. Other devices that could perform a lifting movement in order to lift the container are not necessary. Once the container has been driven out of the loading space, then the loading vehicle can lift the container until it reaches the height of the transfer device, and can then move the container onto the transfer device and lower the container seat so that the container subsequently comes to rest on the transfer device. In the reverse process, the loading vehicle is moved underneath the transfer device, then raises the container seat in order to free the container from the transfer device. The loading vehicle can then be moved away from the transfer device, and the container seat is lowered so that the loading vehicle can be driven into the loading space.

Embodiments are directed to a stacking storage arrangement that includes multiple container receiving spaces and a loading space arranged below the container receiving spaces. The container receiving spaces are held at a first height above the loading space. A loading vehicle, which is movable between the loading space and a transfer region, includes a container seat with a container contact surface. Moreover, the container seat is movable in a lifting direction. In the container contact surface, the container seat further comprises at least two notches opening to at least one side, and at least one transfer device includes transfer fingers configured to match the notches in the container contact surface.

Embodiments are directed to a method of transporting a container in the stacking storage arrangement as described above. The method includes positioning the loading vehicle at the at least one transfer device so that the transfer fingers extend through the at least two notches in the container seat; and at least one of: receiving, from the at least one transfer device, the container on the container contact surface; or moving a container on the container contact surface onto the at least one transfer device.

According to embodiments, after receiving the container on the container contact surface, the method may further include moving the loading vehicle to the loading space arranged below the container receiving spaces.

In accordance with still yet other embodiments, prior to moving the container onto the container contact surface, the method may further include receiving the container on the container contact surface in the loading space arranged below the container receiving spaces; and moving the loading vehicle to the at least one transfer device.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
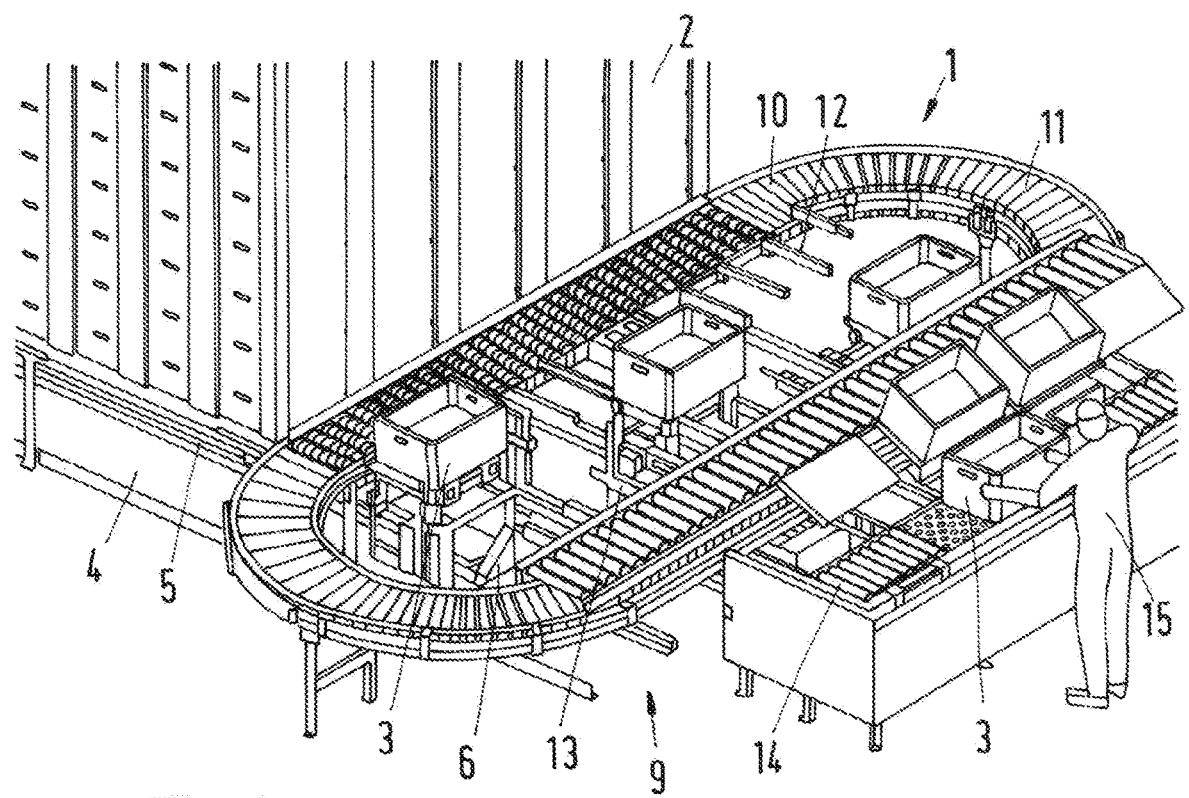
FIG. 1 shows a schematic illustration of a stacking storage arrangement.

FIG. 1 shows, in schematic form, a stacking storage arrangement 1 having multiple container receiving spaces 2 in which containers 3 can be stored in a stacked manner. The stacking storage arrangement 1 comprises multiple container receiving spaces 2 of this type, which can be arranged in the form of a matrix with rows and columns. For example, five columns and sixteen rows can be provided so that a total of eighty stacks of containers 3 can be accommodated.

The containers 3 are introduced into respective container receiving spaces 2 from below, and are also removed from the respective container space 2 from below. Accordingly, a loading space 4 is provided below the container receiving spaces 2. Between the container receiving spaces 2 and the loading space 4, a holding arrangement 5 is provided, of which only a frame is illustrated here. The holding arrangement 5 comprises for each container receiving space 2 one holding device that, for example, can comprise multiple holding latches that hold the bottommost container of a stack and prevent a movement of the bottommost container, and therefore a movement of the stack, into the loading space 4.

If a container 3 is to be placed into storage in a container receiving space 2, that container 3 is driven into the loading space 4 with a loading vehicle (or trolley) 6. When the loading vehicle 6 has reached a position beneath a container stack, in which position the container 3 being placed into storage is to be placed into storage, then a container seat 7 of the loading vehicle 6 is lifted in a lifting direction, namely until the container 3 being placed into storage comes into contact with the bottommost container of a stack. The container seat 7 is lifted further, and thus lifts not only the container 3 being placed into storage, but also the stack of remaining containers. This lifting takes place until the container being placed into storage has been moved past the holding device. The entire stack, including the container being placed into storage, is subsequently lowered until the holding device engages with the container newly placed into storage and holds the container in place. The container seat is preferably guided in the loading vehicle 6 over the entire lifting path, which, on the one hand, effects a high stability during the lifting. On the other hand, the container 3 is held securely on the container seat 7 when the loading vehicle 6 is moved.

During the removal of a container 3, the loading vehicle 6 is moved back into a position beneath the container stack. The container seat 7 is lifted until it comes into contact with the container being removed. The container seat 7 is lifted further and thus lifts the entire stack, namely until the container being removed comes free of the holding device. The holding device is then released. For this purpose, unlocking elements 8 provided on the loading vehicle can be used, for example, which unlocking elements 8 unlock the holding device, that is, move the holding device into a release position, and keep the holding device open until the container 3 being removed has been moved into the loading space 4 by lowering the container seat 7. The unlocking elements 8 are then also moved downwards in tandem, so that the holding device can once again hold the bottom container of the remaining stack in place.

The loading vehicle 6, three of which are illustrated in FIG. 1, then conveys the container 3 in a lowered position out of the loading space 4 into a transfer region 9, in which transfer region 9 at least one transport device 10 is arranged which is guided in a circuit and comprises a plurality of driven rollers 11. However, not all rollers need to be driven, as long as it is ensured that the container 3 can be moved on the transport device 10 over the entire circuit. The transport device 10 does not necessarily need to be closed, as illustrated, but rather can also be embodied in a U-shape or in another manner, for example. A closed circuit is advantageous, however.

The transfer region 9 comprises multiple transfer devices. A first type 12 of transfer device is provided to supply a container 3 that is to be placed into storage in a container receiving space 2. This first type of transfer device 12 is explained in greater detail in connection with FIG. 4. A second type 13 of transfer device is furthermore provided. The second type 13 of transfer device serves to receive a container 3 that has been removed from a container receiving space 2. On the side of the transport device 10 facing away from the second type 13 of transfer device, a handling station 14 is arranged in which an operator 15 has access to the container 3, for example to remove goods or objects or introduce such goods or objects into the container 3 at this location.

Figures 2, 3:
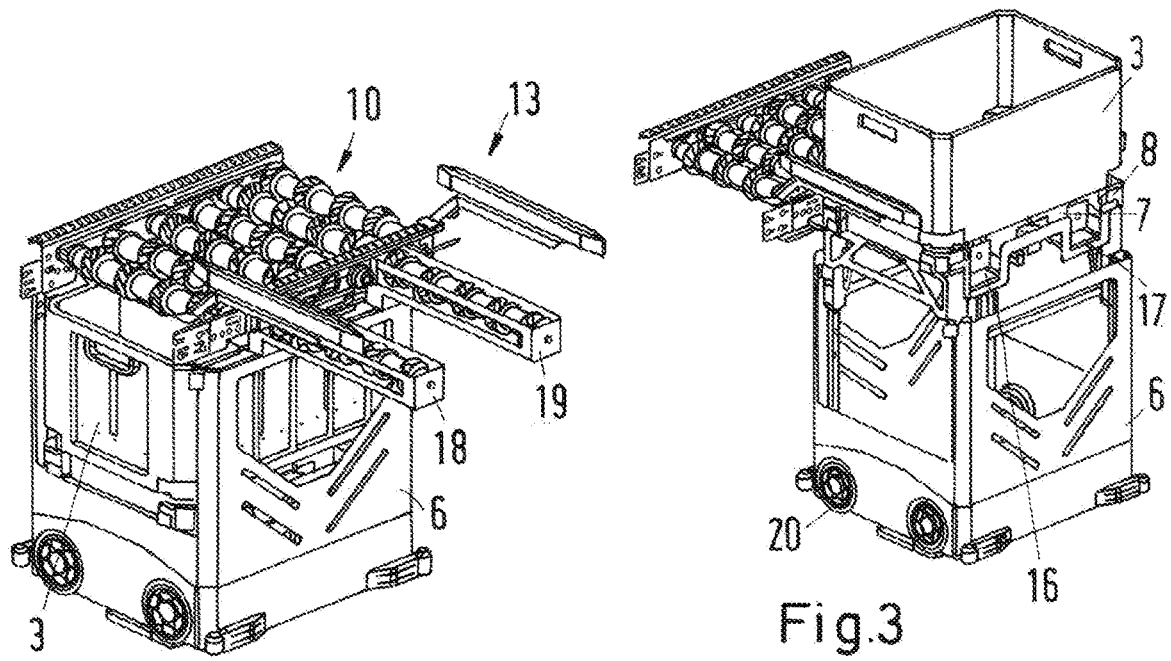
FIG. 2 shows a loading vehicle on the way into a transfer device.
FIG. 3 shows the loading vehicle during the transfer of a container into the transfer device.

FIGS. 2 and 3 show a transfer device of the second type.

As can be seen in FIG. 3, the loading vehicle 6 comprises in the container seat 7 two notches 16, 17. The transfer device 13 of the second type comprises two transfer fingers 18, 19. The transfer fingers 18, 19 fit into the notches 16, 17. The loading vehicle 6 comprises wheels 20 with which it can be moved in a direction of travel. The transfer fingers 18, 19 and also the notches 16, 17 extend preferably parallel to the direction of travel.

The transport device 10 comprises straight sections with multiple rollers 21, 22 arranged parallel to one another. All rollers 21, 22 can be rotated about parallel roller axes, and at least a large portion of the rollers 21, 22 can also be rotationally driven by corresponding drives. The drives are embodied such that each of the driven rollers 21, 22 can be rotated in both rotation directions. The transport device 10 also comprises curved sections with rollers, the axes of which are not aligned parallel to one another.

Rolling bodies 23 are rotatably mounted on the circumference of the roller 21. The rolling bodies 23 are rotatably arranged in a rolling body cage 24 that is fitted onto the circumference of the roller 21 or otherwise firmly connected to the roller 21. The rolling bodies 23 can be turned about rolling body axes that are arranged askew of or oblique to the roller axis of the roller 21.

Analogously, the roller 22 comprises rolling bodies 25 that are rotatably mounted in a rolling body cage 26. A container 3 then rests on the rolling bodies 23, 25. The rolling body axes of the rolling bodies 23, 25 thereby respectively form opposing equal angles with a projection of the roller axes on the base of the container 3.

When a roller 21, 22 is rotated, then the rolling bodies 23, 25 are also rotated and produce a driving force on a container 3 that is resting on the rolling bodies 23, 25. This driving force has two components. One component is directed perpendicular to the roller axes. The other component is directed parallel to the roller axes. If the two rollers 21, 22 are rotated in the same direction, then the component of the driving force that is directed parallel to the roller axes becomes zero and the container is moved perpendicular to the roller axes. If the rollers 21, 22 are moved in opposite directions, then the force directed perpendicular to the roller axes becomes zero and the container is moved parallel to the roller axes.

Figure 4:
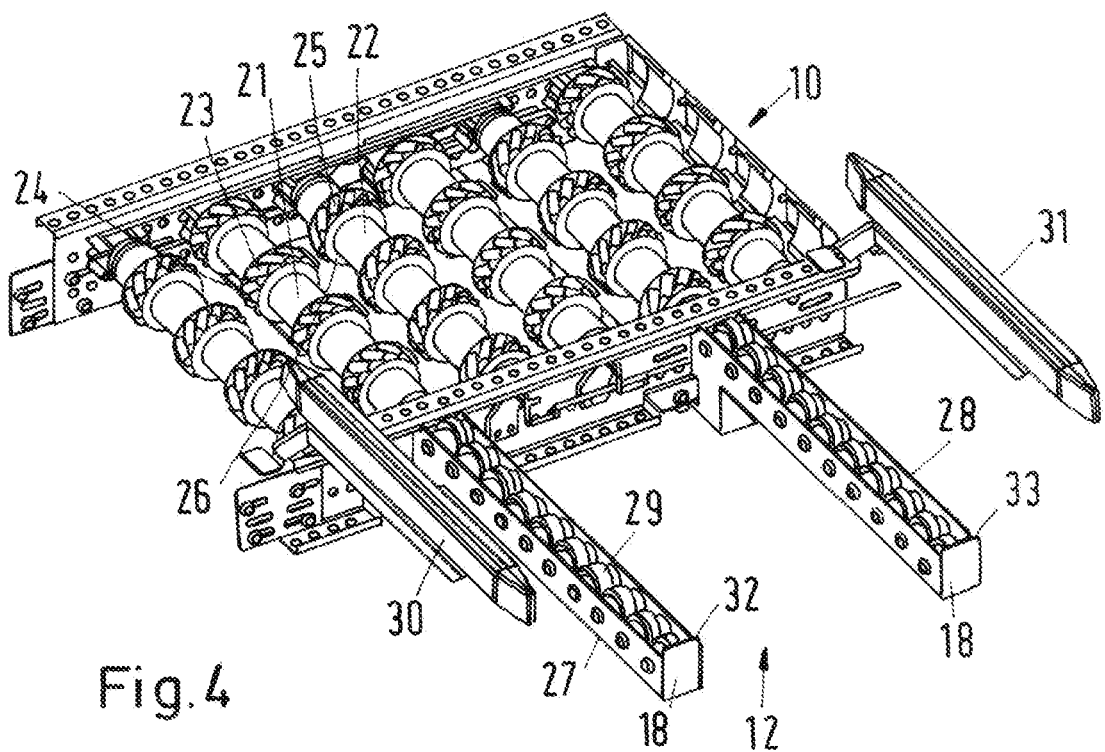
FIG. 4 shows a transfer device of the first type.

In the transfer station of the first type 12 illustrated in FIG. 4, this means that a container, when the rollers 21, 22 are rotated in opposite directions, is transported onto the transfer station 12.

In the transfer station of the first type 12, the transfer fingers are embodied as bars 27, 28 of small rollers. Each bar 27, 28 of small rollers comprises a plurality of rotatably mounted small rollers 29, wherein the small rollers 29 can be rotated about axes that run perpendicular to the roller axes of the rollers 21, 22. A drive for the small rollers 29 is not necessary if the bars 27, 28 of small rollers are slightly inclined.

The transfer device of the first type 12 also comprises lateral stops 30, 31 which ensure a lateral positioning of a container 3. At each end of the bar 27, 28 of small rollers, an end stop 32, 33 is provided which prevents a container from sliding off of the bar 27, 28 of small rollers.

Figure 5:
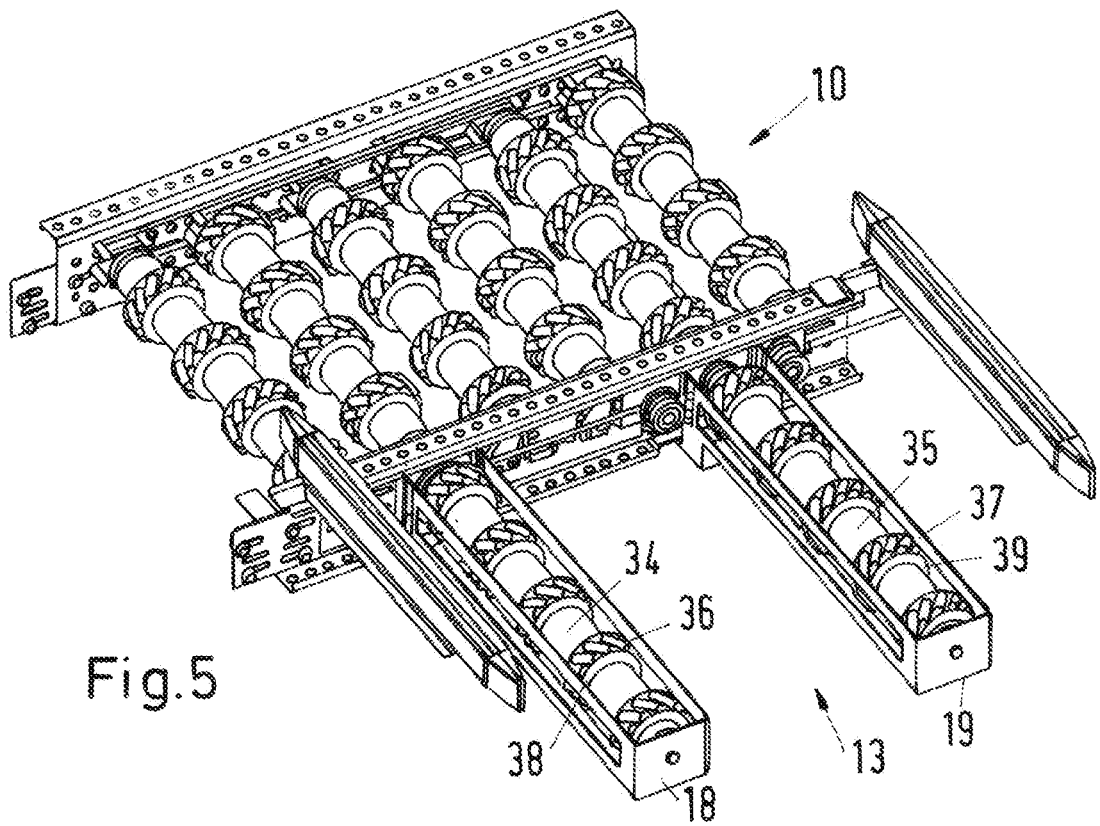
FIG. 5 shows a transfer device of a second type.

In FIG. 5, the same transport device 10 is illustrated, albeit with a transfer device of the second type 13. Here, the transfer fingers 18, 19 are also embodied with rollers 34, 35, which themselves are provided with rolling bodies 36, 37. The rollers 34, 35 can be rotated about roller axes. The rolling bodies 36, 37 are rotatably mounted in rolling body cages 38, 39, namely around rolling body axes that are askew of or oblique to the roller axes of the rollers 34, 35. The rolling bodies 36, 37 form contact surfaces for a container. In the region of the contact surface, the rolling bodies 36, 37 have oppositely directed angles, that is, they form oppositely equal angles with a projection of the roller axes on the base of the container 3.

The function of the rollers 34, 35 is analogous to the function of the rollers 21, 22. If a container 3 is placed on the rolling bodies 36, 37 and the rollers 34, 35 are rotated in opposite directions, then the container 3 is conveyed into the transport device 10.

A container 3 is conveyed out of the loading space 4 into the transfer region 9 using the loading vehicle 6. It is evident that the loading vehicle 6 with the container can be driven through the transport device 10 from below. The transport device 10 and the transfer fingers 18, 19 are located at a height that roughly corresponds to the height of the holding arrangement 5, so that the loading vehicle 6, even with a received container 3, has enough space to be driven past the transport device 10 from below.

Once the loading vehicle 6 has reached a region inside the transport device 10, the container 3 is lifted by the container seat 7. The loading vehicle 6 then moves back again a short distance, wherein the transfer fingers 18, 19 can enter into the notches 16, 17 on the container seat 7. The container seat 7 is lifted far enough so that the container 3 can be transported over the transfer fingers 18, 19 without touching the transfer fingers 18, 19. The container seat 7 can then be lowered, whereby the container 3 comes to rest on the transfer fingers 18, 19. In the transfer device of the second type 13, the container 3 is then conveyed by the rolling bodies 36, 37 into the transport device 10, in that the rollers 34, 35 are rotated in opposite directions.

When the container 3 has arrived in the transport device 10, the rollers 21, 22 are rotated in the same direction in order to bring the container 3 into a desired position for the handling station 14. When the container 3 has arrived there, the rollers 21, 22 can be rotated in opposite directions in order to convey the container 3 into the handling station 14. The operator 15 then has access to the interior of the container 3.

If the container 3 is to be transported back into a container receiving space 2 again, then the transport device 10 conveys it up to a transfer device of the first type 12. There, the rollers 21, 22 are rotated in opposite directions again and convey the container 3 onto the bars 27, 28 of small rollers.

The container 3 can remain there until a loading vehicle 6 is free. The loading vehicle 6 is then driven beneath the bars 27, 28 of small rollers, and the container seat 7 is lifted until the bars 27, 28 of small rollers can enter into the notches 16, 17. The container 3 can then be lifted off of the bars 27, 28 of small rollers by further lifting of the container seat 7. If the loading vehicle 6 is then driven away from the container receiving spaces 2, the container 3 comes free from the transfer device of the first type and can then be lowered so that the state of the loading vehicle 6 illustrated in FIG. 2 once again occurs.

Because the transfer device of the first type 12 is arranged closer to the container receiving spaces 2 than the transfer device of the second type 13, it is essentially ensured that an empty loading vehicle 6 can be driven into the transfer device of the first type 12 on the way back, as it were, from the transfer device of the second type 13 to the loading space 4.

The term "container" is to be understood here in a broad sense. The container does not necessarily need to be closed. It can also comprise open sidewalls, provided it is ensured that the container 3 is stackable and can be held in the holding arrangement 5.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:
1. A stacking storage arrangement comprising:
multiple container receiving spaces, in which containers are stackable for storage;
a loading space arranged below the container receiving spaces;
a releasable holding arrangement located between the loading space and the multiple container receiving spaces at a first height; and
a loading vehicle movable between the loading space and at least one transfer device in a transfer region, the loading vehicle comprising a container seat with a container contact surface, wherein the container seat is movable in a lifting direction to introduce a container into one of the multiple container receiving spaces from below or to remove a container from one of the multiple container receiving spaces from below, wherein, in the container contact surface, the container seat further comprises at least two notches opening to at least one side, and wherein the at least one transfer device comprises transfer fingers configured to match the notches in the container contact surface so that, when the loading vehicle is moved to the at least one transfer device, the transfer fingers enter the at least two notches.

2. The stacking storage arrangement according to claim 1, wherein the transfer fingers form a support surface that merges into a transport device at a same height.

3. The stacking storage arrangement according to claim 2, wherein the at least one transfer device comprises at least two transfer devices and the transport device is connectable to the at least two transfer devices, and wherein the at least two transfer devices comprise two types of transfer devices, which include a first type of transfer device configured to supply a container to be placed into storage in the container receiving space, and a second type of transfer device configured to receive a container removed from the container receiving space.

4. The stacking storage arrangement according to claim 3, wherein the transport device forms a closed circuit and the first type of transfer device is arranged closer to the container receiving spaces than the second type transfer device.

5. The stacking storage arrangement according to claim 4, wherein the at least two transfer devices are arranged inside the circuit.

6. The stacking storage arrangement according to claim 3, wherein the first type of transfer device and the second type of transfer device are consecutively arranged in a direction of travel of the loading vehicle.

7. The stacking storage arrangement according to claim 3, further comprising a handling station in which an operator has access to a container being arranged on a side of the transport device opposite of the second type of transfer device.

8. The stacking storage arrangement according to claim 2, wherein the transport device comprises, in the region of the at least one transfer device, rollers, which are arranged in pairs that are rotationally driven about roller axes and rolling bodies arranged on circumferences of the rollers that are rotatable around rolling body axes, wherein the roller axes and the rolling body axes are oriented obliquely to one another and wherein the rolling bodies of one of the pair of rollers are angularly arranged in opposing directions to the rolling bodies of an other of the pair of rollers, and wherein each roller is drivable in two rotation directions.

9. The stacking storage arrangement according to claim 1, wherein the transfer fingers comprise at least two rollers rotationally driven about roller axes and rolling bodies arranged on circumferences of the rollers that are rotatable around rolling body axes, wherein the roller axes and the rolling body axes are oriented obliquely to one another and wherein the rolling bodies of one of the at least two rollers are angularly arranged in opposing directions to the rolling bodies of an other of the at least two rollers.

10. The stacking storage arrangement according to claim 9, wherein, the at least one transfer device comprises a second type of transfer device configured to receive the container removed from the one of the multiple container receiving spaces on the transfer fingers.

11. The stacking storage arrangement according to claim 1, wherein the transfer fingers are embodied as a bar of small rollers.

12. The stacking storage arrangement according to claim 11, wherein the bar of rollers is inclined.

13. The stacking storage arrangement according to claim 11, wherein, the at least one transfer device comprises a first type of transfer device configured to supply the container to be introduced into the one of the multiple container receiving spaces via the transfer fingers.

14. The stacking storage arrangement according to claim 1, wherein, in the transfer region, the at least one transfer device is arranged at a second height that corresponds to the first height.

15. A method of transporting a container in the stacking storage arrangement according to claim 1, the method comprising:

positioning the loading vehicle at the at least one transfer device so that the transfer fingers enter into the at least two notches in the container seat; and at least one of:
receiving, from the at least one transfer device, the container on the container contact surface; or
moving a container on the container contact surface onto the at least one transfer device.

16. The method according to claim 15, wherein, after receiving the container on the container contact surface, the method further comprises moving the loading vehicle to the loading space arranged below the multiple container receiving spaces.

17. The method according to claim 15, wherein, prior to moving the container on the container contact surface onto the at least one transfer device, the method further comprises:

receiving the container on the container contact surface in the loading space arranged below the multiple container receiving spaces; and moving the loading vehicle and the container on the container contact surface to the at least one transfer device.

* * * * *